United States Patent Office 3,705,039
Patented Dec. 5, 1972

3,705,039
LOW CALORIE SWEETENER MIXTURE OF MALTITOL AND MALTOTRIITOL
Masakazu Mitsuhashi, Mamoru Hirao, and Kaname Sugimoto, Okayama, Japan, assignors to Hayashibara Company, Okayama-shi, Okayama, Japan
No Drawing. Filed July 10, 1970, Ser. No. 53,993
Claims priority, application Japan, July 13, 1969, 44/55,306
Int. Cl. A23l 1/26
U.S. Cl. 99—28                                       11 Claims

ABSTRACT OF THE DISCLOSURE

Liquefied starch solution is subjected to the action of an alpha-1,6-glucosidase and saccharified. The resulting linear chained mixed saccharification product is hydrogenated to produce a non-digestive linear chained sweetener mixture of maltitol and maltotriitol. The sweetener mixture is added to various foods and drinks.

---

This invention relates to a process for production of foods and drinks, which has improved and increased sweetness, without any increase in the nutrient value.

Conventionally, sugars, such as cane sugar, glucose, levulose, starch syrups, honey etc., or artificial sweeteners, such as saccharin and sodium cyclohexylsulfamate, were used to add sweetness to foods and drinks. However, these sugars and artificial sweeteners easily crystallize. Drop of temperature or an increase of degree of concentration causes crystallization in the products and thus results in changes in the tastes as well as deterioration of the product values. The disadvantages of artificial sweeteners are due to their undesirable tastes, low solubilities and not having the abilities to give weights to the products. Conventional types of sugar alcohol sweeteners, for example, sorbitol, are digestible in human bodies, therefore they are quite unsuitable for the production of sweetened foods and non-caloried sweetened foods for diabetics or for those who are conscious of and axious about their weight or obesity and figuures.

The inventors have now developed a new sweetener which eliminates these disadvantages, which is a sugar alcohol mixture consisting mainly of maltitol and maltotriitol, and has a good, strong sweetness and desirable viscosity not as high as starch syrup, and is relatively freely controllable.

Common acid or enzyme conversion starch syrups contain branched oligosaccharides and dextrins, due to amylopectin of branched structure in the starch, and therefore they have extremely high viscosities. By simultaneously employing alpha-1,6-glucosidase, which debranches the above mentioned branched structures, to convert amylopectin into only linear chained molecules during the saccharification procedure, and by hydrolyzing with beta-amylases, a mixture of sugars is obtained, which only contains linear chained molecules, such as maltose, maltotriose and a small amount of tetraose etc. Sugar alcohol, obtained by hydrogenating this mixture, has an unexpected high sweetness. As the material is a polyalcohol, it is heat-stable and its viscosity is lower than conventional starch syrup, due to its linear chained structure. Further, this viscosity is variable to a wide extent by the degree of beta-amylolysis. That is, when beta-amylolysis is carried out to nearly 100%, the resultant product is made up mostly of maltose, whereas when decomposition is suspended at an earlier stage, the product contains linear chained oligosaccharides and its sweetness somewhat decreases. By using combinations of alpha-amylase, glucoamylase and acids besides beta-amylase in producing the material, the rate of linear chained oligosaccharides excluding maltose can be changed. As the compositions of sugars and viscosities are variable, sugar alcohols with parallel properties are obtainable by hydrogenation.

Patents using apparently similar sweeteners have been issued recently. However, the products according to these patents are hydrogenation products of common malto syrups which contain less than 60% of maltose, produced by hydrolysis of starches with only beta-amylases, and contain more than 50% of branched chained oligosaccharides and dextrins. Thus, the viscosities of these products are excessively high with no possible means of regulation. Organic solvent precipitation is the only means to remove the branched chained dextrins and to increase the purity of maltose. This requires much trouble and expense, and thus its commercialization is impossible. The sweetener of the present invention has an essentially different molecular structure and is not comparable with other sweeteners.

The objectives of the sweetener according to this invention are as follows:

(1) This invention offers a process for production of foods and drinks with the addition of hydrogenated sugar i.e. sugar alcohols, which contain mostly maltose, maltotriose and small amounts of linear chained oligosaccharides, such as maltotetraose. Thus, by blending the strong sweetness of maltitol and the mild sweetness of hydrogenation products of linear chained oligosaccharides, such as maltotriitol, food products with good and strong sweetness are available, as well as foods and drinks with a sweetness that harmonizes well with artificial sweeteners.

(2) Even if this sweetener, which consists mainly of maltitol and maltotriitol, is added to foods and drinks to produce highly sweet products, owing to the fact that the components of this sweetener, maltitol and maltotriitol are non-crystallizable, the products do not crystallize. In cases where high concentrations of this sweetener are employed, for example, Yokan, sponge cake, and concentrated juices, no crystallization is observed as in the cases where cane sugar is used, even after prolonged periods, nor is the palatability and appearance of the confectionary products spoiled. This sweetener permits foods and drinks to be prepared with prolonged shelf life without forming white turbidity.

(3) This sweetener is a hydrogenated mixture, which contains linear chained oligosaccharides, maltotriitol and tetraitol as well as maltitol, has a slightly higher viscosity than cane sugar, and improves the palatabilities of foods and drinks, renders luster to the products, renders a suitable viscosity to syrups, and offers a process for producing foods and drinks with improved flavor.

(4) This invention provides processes for producing low caloried or non-caloried foods and drinks that are suitable for diabetic, or for those who are conscious of and anxious about their weight or obesity and figures, by the addition of this non-digestive sweetener, which is a linear chained sugar alcohol mixture of maltitol, maltotriitol etc., to foods and drinks without increasing the nutrient values of the products.

(5) Further objectives of this invention are to impart water retention capacity and a thicker sweetness than cane sugar to foods and drinks, to stabilize the color and flavor to be added to the products and for the stabilization of the inherent flavors, and thus to provide foods and drinks rich in natural flavors.

(6) This invention provides color stable foods and drinks such as bakery products and hard candies, which are subjected to heat treatment procuedures, by adding the linear chained sugar alcohol according to the present invention, which is heat stable and contains mainly maltitol and maltotriitol, to the products as a sweetener, and subsequently preventing coloration caused by decomposition of the sweeteners and chemical actions of nitrogen compounds.

The present invention relates to a process for the production of foods and drinks, which is characterized in the utilization of a sweetener, which mainly consists of non-caloried maltitol and maltotriitol. This sweetener has a better taste than cane sugar, a desirable viscosity, high solubility and water retention capacity, and is non-crystallizable, and also imparts to the products flavor and color stabilities.

The sweetener according to this invention is a non-reducing substance containing maltitol and maltotriitol as main components and has the following formula:

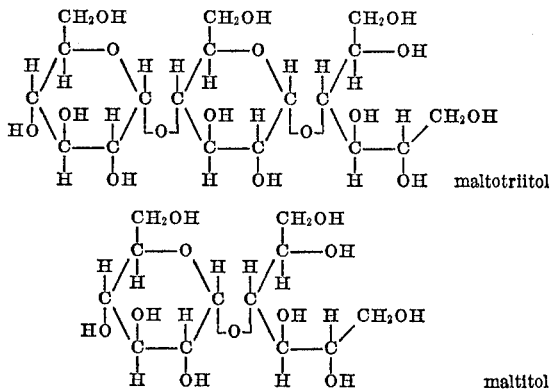

A process for production of this sweetener, which contains mostly maltitol and maltotriitol, is as follows: A 30% by weight suspension of starch is enzymatically liquefied at 90° C., pH 6.0, using a liquefying amylase of 0.2% on a dry basis to form a uniform liquefied solution. The solution is cooled rapidly to 50° C. Twenty units of alpha-1,6-glucosidase, obtained from a culture broth of *Escherichia intermedia*, and ten units of beta-amylase extracted from wheat bran respectively per gram of starch, are added to the solution, and saccharified for 30 hours. Thus a sugar solution which contains 80–95% maltose, about 5–15% maltotriitol is obtained. After purification with active carbon and ion exchange resins a colorless and clear sugar solution is obtained.

After the sugar mixture, thus obtained and consisting of maltose and higher linear chained oligosaccharides, was concentrated to 40–50%, 8% of Raney nickel catalyst based on the starch was added to the solution and was heated in an autoclave with stirring to 90–125° C. During the heating procedure, hydrogen was charged at a pressure of 20–100 kg./cm.$^2$. The catalyst employed was removed from the mixture after absorption of hydrogen. A colorless, transparent and viscous mixture of maltitol, maltotriitol and higher linear chained oligosaccharide alcohols was obtained after purification with active carbon and ion exchange resins. Mixtures of lower saccharification degrees contained a small amount of higher linear chained oligosaccharide alcohols, such as maltotetraitol etc. Thus, the viscosities of hydrogenated products of lower conversion degree or with less maltose contents are slightly higher. However, the viscosities of these products are not as high as those of saccharification products obtained by only using common beta-amylases. When combinations of alpha-1,6-glucosidase, beta-amylase, alpha-amylase, or other enzymes or acids are employed, starch syrups consisting only of various compositions of linear chained molecules are obtained.

Results of studies on the characteristics of using this sweetener, which consists of maltitol with maltotriitol, for production of foods and drinks are as follows:

(1) Sweetness

The results of panel tests on the degrees and qualities of sweetness of this sweetener show that this sweetener has a mild and well harmonized blandness that surpasses those of only maltitol. It has better aftertaste, than maltitol.

Its sweetness degree is higher than glucose, though less than cane sugar. It has a sweetness equivalent to about 75% of that of cane sugar without any significant difference from maltitol. Panel tests conducted with groups of thirty persons gave the following results.

(1) Sweetness of cane sugar, maltitol, the maltitol-maltotriitol sweetener and glucose by a paired preference test.

By significant difference determination, there were obtained significant differences at 1% and 5%. At least five tests were repeated on each substance, at concentration degree of 70%, 35%, 20% and 10%. From the results the following order was obtained.

Cane sugar>maltitol=maltitol-maltotriitol>glucose. This shows that the mixture has a sweetness that comes between that of cane sugar and glucose, though no significant difference was observed between maltitol and the maltitol-maltotriitol.

(2) Comparison of the sweetness degrees between the maltitol-maltitriitol sweetner and cane sugar.

To reduce viscosity, 35% of an aqueous solution of the maltitol-maltotriitol sweetener was prepared and compared with cane sugar solutions of 5%, 10%, 15%, 20%, 25% and 30% concentration degrees. It was found that the 35% aqueous solution of the sweetener has a sweetness equivalent to 25% aqueous cane sugar solution.

(2) Non-crystallization and crystallization preventive properties

The maltitol-maltotriitol sweetnener dissolved freely in water up to 100%. In cases of aqueous solutions with concentration degrees of 70–90%, no formation of crystallization was observed after a standing period.

Further, to 70% aqueous solutions of cane sugar and glucose were added 10% of this sweetener and compared with the control at room temperature. The non-added materials began to crystallize after one day, whereas the sweetener added material showed no turbidity even after a period of one week.

(3) Non-caloric properties

Oligosaccharides, such as maltose, maltotriose, etc. are easily decomposed by various amylases, whereas the linear chained oligosaccharide alcohols are hardly decomposed. The results are shown in the following table.

SACCHARIFICATION RATE WITH VARIOUS ENZYMES

| | Units/ml. of— | | Buffer solution, pH | °C. | Time of reaction (hrs.) | Hydrolysis of the said sweetener (percent) | Hydrolysis of maltose (percent) |
|---|---|---|---|---|---|---|---|
| | NA | SA | | | | | |
| Rhizopus glucoamylase | 5 | 10.0 | 5.0 | 40 | 5 | 7 | 100 |
| Porcine pancreatic maltase | 0.17 | 0 | 7.5 | 40 | 10 | 5 | 82 |
| Yeast maltase | 0.07 | 0 | 6.5 | 35 | 8 | 10 | 75 |

NOTE.—Test samples contain 85% maltitol. MA=Maltase activity; SA=saccharifying activity.

Reactions were performed with test solutions comprising 5 ml. of substrata (concentration degree 1%), 4 ml. of buffer solution and 1 ml. of enzyme solution. The absorption test of the sweetener within digestive organs of higher animals showed that the absorption rate was zero and thus this substance was completely non-caloric.

Into both end-tied intestines of rabbits, after fasting for 24 hours, were charged 50 ml. of 20% aqueous maltitol-maltotriitol sweetener and aqueous cane sugar solution of the same concentration as controls, of respectively equivalent amounts. After a few hours the residual amount of sugars in the intestine were determined. 90% of the cane sugar was absorbed, while the sweetener according to the present invention hardly decreased, thus proving that this sweetener was not absorbed within the interior of the bodies. No unusual symptom, such as engorgement was observed.

Xylose, sorbitol, etc., which have conventionally been considered as non-caloried sweeteners, were absorbed in the bodies and therefore they cannot be defined as strictly non-caloried as is the case with the new sweetener.

The new non-caloried sweetener has a strong sweetness and imparts a heavy body to food products, and accordingly is an indispensable sweetener for the production of non-caloried foods and drinks.

(4) Viscosity, moisture and flavor retentive properties

As maltitol-maltotriitol sweetener contains higher oligosaccharide alcohols, the viscosity of this sweetener is naturally higher than cane sugar or maltitol, etc. However, this sweetener consists only of linear chained molecules, thus no excessive increase of viscosity was observed. Also, the sweetener, which is a polyalcohol, has moisture and flavor retentive properties. Results of tests performed on moisture retentive properties of sponge cakes and flavor retentive properties of natural juice showed that in each case this sweetener was equal or even superior to cane sugar.

The viscosity value of a 70% concentration solution, containing 85% maltitol on a dry basis, was higher than that of cane sugar. However this viscosity value can be controlled by the extent of beta-amylolysis. The results from the above performed tests are shown below. The regulation of viscosity is possible by simultaneously using alpha-amylases, acids etc. These means are impossible in the cases of hydrogenated products made from conventional malt syrups.

| Temperature (° C.): | Viscosity (centipoise) |
| --- | --- |
| 20 | 295 |
| 30 | 187 |
| 40 | 103 |
| 50 | 70 |
| 60 | 51 |

(5) Heat stability and chemical stability

Concentration of the maltitol-maltotriitol sweetener by direct heating (up to 200° C.) to an almost anhydrous state causes no color-action or change of quality. When heated over 200° C., white smoke was observed coming from the sweetener and it gradually colored. The sweetener had difficulty in hardening instantly upon cooling. Heating the aqueous solution with 1% amino acid added did not cause discoloration.

This maltitol-maltotriitol sweetener has many superior characteristics as a sweetener source for foods and drinks, as well as a suitable additive for non-caloried foods.

Accordingly, this sweetener is a suitable additive for carbonate beverages such as cola drinks, ciders, etc., lactated beverages, such as Calpis, concentrated fruit juice, etc. Utilization of this sweetener as a substitute for glucose, cane sugar and other syrups make even higher concentrated solutions possible, and all the carbohydrate contents may be converted into non-caloried substances, with resulting medical and beauty effects. Due to its ability to impart viscosity and flavor stability to the products, first rate drinks can be produced utilizing this sweetener, which has a decent taste and no undesirable aftertaste as in the cases of cane sugar, maltitol, starch syrups, etc.

Similarly, when it is used in sponge cakes, Japanese cakes and others, the calorie content can be maintained at a minimum and its moisture retentive property prolongs the shelf life greatly, and improves the product's texture, which is a vital problem for these products, and their flavor retentive property thus permits great improvement to be realized, eliminating the disadvantages of cane sugar such as drying and crystallizing.

This sweetener can be added to bakery products such as biscuits, cookies, etc., to produce non-sugar or low-caloried foods. Heat resistance of the sweetener prevents over-baking caused by heating, cracking and deformation which are usually observed upon cooling the baked products, increases yield, prevents dispersion of flavor and increases the durability of foods.

When it is used in jellies, etc., the sweetener not only imparts sweetness to the products but make production of the products with non-caloried components possible. It prevents discoloration and crystallization of the products, imparts moisture and flavor retentive properties to the products and fully exhibits its efficiency of preserving the initial qualities of the products after prolonged periods.

EXAMPLE 1

Process for bottling chestnut syrup preserve

Chestnuts, after removal of their astringent coats were soaked in water overnight. To the chestnuts was added 0.1-0.3% of aluminum potassium sulphate and the mixture was cooked in water to restrain smear and to tighten the sarcocarp. Water was drained. The chestnuts were soaked in 50% aqueous maltitol-maltotriitol sweetener solution, heated for 10 minutes at 80° C., and left to stand for a night.

The next day, to 130 g. of the chestnuts was added a dissolved solution comprising aqueous maltitol-maltotriitol sweetener solution (purity of maltitol 90%), 0.04% saccharin were added to aqueous maltitol-maltotriitol sweetener solution (purity of maltitol 90%) and the thus obtained solution was diluted to a syrup containing 50-65% maltitol. 110 g. of this syrup per 130 g. chestnuts was added to the chestnuts, and the result was packed in bottles.

Products thus prepared had a light beautiful yellow tint, and prevented the coloration caused by reducing sugars such as in the case when glucose was employed. Sarcocarps had suitable tightness with improved surface luster and desirable sweetness. Conventional chestnut syrup preserves, except those using cane sugar, were generally considered not applicable for the market, owing to their extreme coloration. However, the sugar alcohol sweetener, according to this invention, imparts better results and more desirable coloration values than cane sugar. The non-caloric property of this sweetener enables the reduction of the total calorie value to half and thus provides low-caloried foods.

EXAMPLE 2

Process for canning fruits

The sugar solution to be charged into canned oranges was prepared by dissolving 50 kg. of the present sweetener which contained 85% of maltitol (dry base), 25 g. of saccharin in water to a total volume of 100 kg. After the solution was charged to the peeled oranges, the products were canned and sterilized according to usual methods. The syrup produced according to this process, had a suitable viscosity, a mild sweetness that harmonized well with the acid taste of the oranges, retained its flavor satisfactorily and the syrup itself was non-caloried.

EXAMPLE 3

Process for production of sponge cakes

A popular formula for production of sponge cakes is shown below.

| | G. |
| --- | --- |
| Maltitol-maltotriitol sweetner (maltitol content 80%, dry base) | 1,000 |
| Egg | 1,100 |
| Flour | 500 |
| Honey | 50 |

Dough was prepared according to the above formula and the usual method. The dough was poured into an iron pan, covered with paper, and baked in an oven appropriately heated at 180–190° C. The products had an appealing baked color and soft, spongy and an improved texture. Delicious products with suitable moisture were available even after a prolonged storage period, due to the fact that their degradation or drying are delayed by the addition of the sweetener. Also a reduction of carbohydrates to half makes production of low caloried foods possible.

EXAMPLE 4

Process for production of Yokan

An approximately equal amount of the sweetener (moisture content 20%) was added to bean-jam. The mixture was heated gently by usual methods after a suitable amount of agar-agar was added. The resultant was kneaded with care. The moisture content was maintained preferably in a range of 25–27% and cut and packed.

The sweetener is highly heat resistant, and causes no coloration or formation of caramelizing. By utilization of this sweetener, which has a relatively low content of maltitol, Yokan with a desirable viscosity can be produced. The sweetener maintains the specific Yokan color, flavor and taste, and prevents crystallization. Thus Yokan with a fine luster is obtained and its calorie value can be reduced to approximately one third of that of conventional Yokan.

EXAMPLE 5

Process for production of concentrated juice

A formula for 1000 liters of concentrated orange juice is as follows:

| | | |
|---|---|---|
| Five times concentrated orange juice | l.. | 79 |
| 60% aqueous sweetener solution (maltitol purity 85%) | l.. | 750 |
| Citric acid | kg.. | 40 |
| Orange base | l.. | 5 |
| Orange essence | l.. | 2.5 |

To the above ingredients was added water to a total volume of 1000 l. The sweetener especially harmonized with the oranges and imparted to them bodied flavor without decomposing their sweet and sour taste. Especially the sweetener, different from cane sugar, does not crystallize even at high concentration and thus is suitable for production of highly concentrated juices.

EXAMPLE 6

Process for production of carbonated beverages

A method for the preparation of 18 l. of cider is described below:

| | | |
|---|---|---|
| The sweetener (maltitol purity 85%, dry base) | kg.. | 1.5 |
| Saccharin | g.. | 20 |
| Salt | g.. | 5 |
| Citric acid etc. | g.. | 110 |
| Flavor | ml.. | 100 |

The above ingredients were completely dissolved and filtered. Light and bottled refreshing drinks were provided after carbonation by usual methods. A body, and sweetness which harmonizes with sourness, to give a light aftertaste was rendered to the products. Flavor is uniformly distributed in the products. Furthermore, the calorie value of the product can be reduced completely to zero and thus ideal non-calorified, drinks are available.

EXAMPLE 7

Process for production of synthetic Japanese "Sake"

One example of a formulation is as follows:

| | | |
|---|---|---|
| 90% alcohol | l.. | 405 |
| The sweetener (maltitol purity 85%, dry base) | kg... | 75 |
| Sodium glutamate | g.. | 300 |
| Succinic acid | g.. | 1950 |
| Lactic acid (75%) | g.. | 380 |
| Mono-potassium phosphate | g.. | 170 |
| Mono-calcium phosphate | g.. | 170 |
| Sodium succinate | g.. | 325 |
| Sodium chloride | g.. | 300 |
| Aranine, Glycine | g.. | 173 |
| Liquid flavor | g.. | 275 |

The above ingredients were dissolved in water to a total volume of 2,700 l. The solution was kept standing in a cool place and precipitates were filtered. After a maturing period of about one month, the solution was heated at 50° C. and bottled.

This synthetic "sake" was rich in extracts, had a desirable viscosity, very excellent taste and flavor. As this "sake" does not contain digestible sugars, it has significance as a non-calorified "sake."

EXAMPLE 8

Process for production of white wine

Grape juice was collected by removing sarcocarps and seeds from grapes. To the juice was added potassium metabisulfite to prevent growth of microorganisms. Fermentation was carried out with the addition of yeast. Suitable amounts of maltitol-maltotriitol sweetener and alcohol were added to the fermentation resultant. The product was barrelled and fermentation was continued. Subsequently the product was bottled according to the usual method.

Example of a formula:

| | | |
|---|---|---|
| Grape juice | l.. | 170 |
| Potassium metabisulfite | g.. | 40 |
| Yeast | l.. | 7 |
| Alcohol (80%) | l.. | 10 |
| Glucose | kg.. | 3 |
| The sweetener | kg.. | 3 |

This product was equal to conventional white wine with respect to its alcohol and extract content, having less sugar. The soft sweetness of maltitol, etc. and the flavor of the wine blend increased much more with the progress of maturity. These advantages can be maintained for a long period. The product had a desirable sweetness, and a bright yellow tint. The nearly non-calorific property of the sweetener makes this sweetener most suitable for production of diabetic and beauty foods.

EXAMPLE 9

Process for production of sweetened condensed milk

Material milk, with a regulated fat content was sterilized instantly at 110–130° C. After a primary concentration, the sweetener, in an amount equal to 15% of the material milk, was added. The mixture was concentrated and cooled to below 15° C. The resultant was treated to micronize the crystals of lactose. In this case the sweetener was effective in preventing crystallization of lactose and restrained this crystallization to a minimum and pulverized the crystals.

One example of a formula:

| | Percent |
|---|---|
| Water | 25 |
| Whole milk solids | 29 |
| Fat | 7 |
| Protein | 7 |
| Lactose | 13 |
| Ash | 1.5 |
| Maltitol-maltotriitol sweetener | 45 |

This sweetened condensed milk product had a beautiful creamy tint and a desirable viscosity, fat being well dispersed. Owing to the fact that crystallization of lactose was prevented, products with improved palatabilities and easily soluble properties are thus available. The caloric value of the product is one-sixth of the conventional products, and thus can be defined as low-calorified foods.

It will be obvious to those skilled in the art that various changes may be made without departing from the scope of the invention and the invention is not to be considered limited to what is described in th specification.

What is claimed is:

1. A proces for preparing low-calorie foods or drinks, comprising:

subjecting a liquefied starch solution to the action of an α-1,6-glucosidase and effecting saccharification to produce a linear chained mixed saccharification product, hydrogenating said linear chained mixed saccharification product to produce a sweet, non-crystallizable, heat-stable, luster-adding, non-digestive, water-retentive, linear chained sweetener mixture of maltitol and maltotriitol, and adding said sweetener mixture to foods or drinks to obtain products having increased sweetness without an increase in the caloric value thereof, having a decreased tendency to crystallize and having no undesirable after-taste.

2. A process according to claim 1 wherein the drinks are concentrated orange juices.

3. A process according to claim 1 wherein the drinks are carbonated beverages.

4. A process according to claim 1 wherein the product is sweetened condensed milk.

5. A process according to claim 1 wherein the foods are baked products and the sweetener is added before baking.

6. A process according to claim 1 wherein the drinks are light alcoholic beverages.

7. A food or drink product having increased sweetness without an increased caloric value, having good heat-stability and luster, having a decreased tendency to crystallize and having no undesirable after-taste, produced by the process of claim 1.

8. A low-calorie carbonated beverage in accordance with claim 7 wherein said sweetener mixture is the major or sole sweetener.

9. A low-calorie condensed milk in accordance with claim 7 wherein said sweetener mixture is the major or sole sweetener.

10. A low-calorie food in accordance with claim 7 wherein said sweetener mixture is the sole sweetener.

11. A low-calorie drink in accordance with claim 7 wherein said sweetener mixture is the sole sweetener.

References Cited

UNITED STATES PATENTS

| 3,565,765 | 2/1971 | Heady et al. | 195—31 R |
| 3,329,507 | 4/1967 | Conrad | 99—141 A |
| 3,492,131 | 1/1970 | Schlatter | 99—141 A |
| 2,868,847 | 1/1959 | Boyers | 260—635 C |

MORRIS O. WOLK, Primary Examiner

S. B. DAVIS, Assistant Examiner

U.S. Cl. X.R.

99—30, 55, 79, 86, 141 R, 142, 205; 195—31 R; 260—209 R